United States Patent
Sumioka

(10) Patent No.: US 6,788,711 B1
(45) Date of Patent: Sep. 7, 2004

(54) DEMULTIPLEXER

(75) Inventor: Tetsuji Sumioka, Tokyo (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 09/679,329

(22) Filed: Oct. 4, 2000

(30) Foreign Application Priority Data

Oct. 5, 1999 (JP) .......................................... 11-284759

(51) Int. Cl.⁷ ................................................. H04J 3/02
(52) U.S. Cl. ........................ 370/542; 370/545; 348/390; 348/423
(58) Field of Search ................................. 370/352, 401, 370/474, 479, 542; 348/423, 390; 374/352, 353, 474, 509, 515, 542

(56) References Cited

U.S. PATENT DOCUMENTS 5,835,591 A * 11/1998 Cochon et al. ............. 380/212

* cited by examiner

Primary Examiner—Dang Ton
Assistant Examiner—Inder Pal Mehra
(74) Attorney, Agent, or Firm—Frommer Lawrence & Haug LLP; William S. Frommer

(57) ABSTRACT

A demultiplexer, capable of extracting specific individual data from among packets in which the specific individual data is stored in predetermined units with a high efficiency, for A packet demultiplexer demultiplexes first to third packets and an extractor extracts additional information from the third pocket. The extractor has a first comparator for comparing control data in a harder region of the third packet and first comparison data based on mask data, and a second comparing comparator for comparing the control data and second comparison data based on the first comparison data and the mask data. The additional information is extracted from the third packet when the result of comparison of the first comparator indicates coincidence and result of comparison of the second comparator indicates noncoincidence.

7 Claims, 10 Drawing Sheets

FIG.4

|  | | MASK DATA (8 BITS) | COMPARISON DATA (8 BITS) |
|---|---|---|---|
| FIRST CONDITION DATA | FIRST BYTE | | |
| | SECOND BYTE | | |
| | ⋮ | | |
| | N-TH BYTE | | |
| SECOND CONDITION DATA | FIRST BYTE | | |
| | SECOND BYTE | | |
| | ⋮ | | |
| | N-TH BYTE | | |
| THIRD CONDITION DATA | FIRST BYTE | | |
| | SECOND BYTE | | |
| | ⋮ | | |
| | N-TH BYTE | | |
| ⋮ | ⋮ | ⋮ | ⋮ |
| M-TH CONDITION DATA | FIRST BYTE | | |
| | SECOND BYTE | | |
| | ⋮ | | |
| | N-TH BYTE | | |

FIG.7

| | | MASK DATA (8 BITS) | FIRST COMPARISON DATA (8 BITS) |
|---|---|---|---|
| FIRST CONDITION DATA | FIRST BYTE | | |
| | SECOND BYTE | | |
| | ⋮ | | |
| | N-TH BYTE | | |
| SECOND CONDITION DATA | FIRST BYTE | | |
| | SECOND BYTE | | |
| | ⋮ | | |
| | N-TH BYTE | | |
| THIRD CONDITION DATA | FIRST BYTE | | |
| | SECOND BYTE | | |
| | ⋮ | | |
| | N-TH BYTE | | |
| ⋮ | ⋮ | ⋮ | ⋮ |
| M-TH CONDITION DATA | FIRST BYTE | | |
| | SECOND BYTE | | |
| | ⋮ | | |
| | N-TH BYTE | | |

FIG.9A

|  | MSB | | | LSB |
|---|---|---|---|---|
| MASK DATA | 00 | 00 | 00 | 11 |
| COMPARISON DATA | 11 | 11 | 11 | 01 |
| CONTROL DATA | 10 | 10 | 11 | 01 |

FIG.9B

|  | MSB | | | LSB |
|---|---|---|---|---|
| MASK DATA | 00 | 00 | 00 | 11 |
| FIRST COMPARISON DATA | 11 | 11 | 11 | 01 |
| CONTROL DATA | 10 | 10 | 11 | 01 |
| SECOND COMPARISON DATA | 10 | 10 | 10 | XX |

FIG.9C

|  | MSB | | | LSB |
|---|---|---|---|---|
| MASK DATA | 00 | 00 | 00 | 11 |
| FIRST COMPARISON DATA | 00 | 11 | 11 | 01 |
| CONTROL DATA | 10 | 10 | 11 | 01 |
| SECOND COMPARISON DATA | 10 | 10 | 10 | XX |

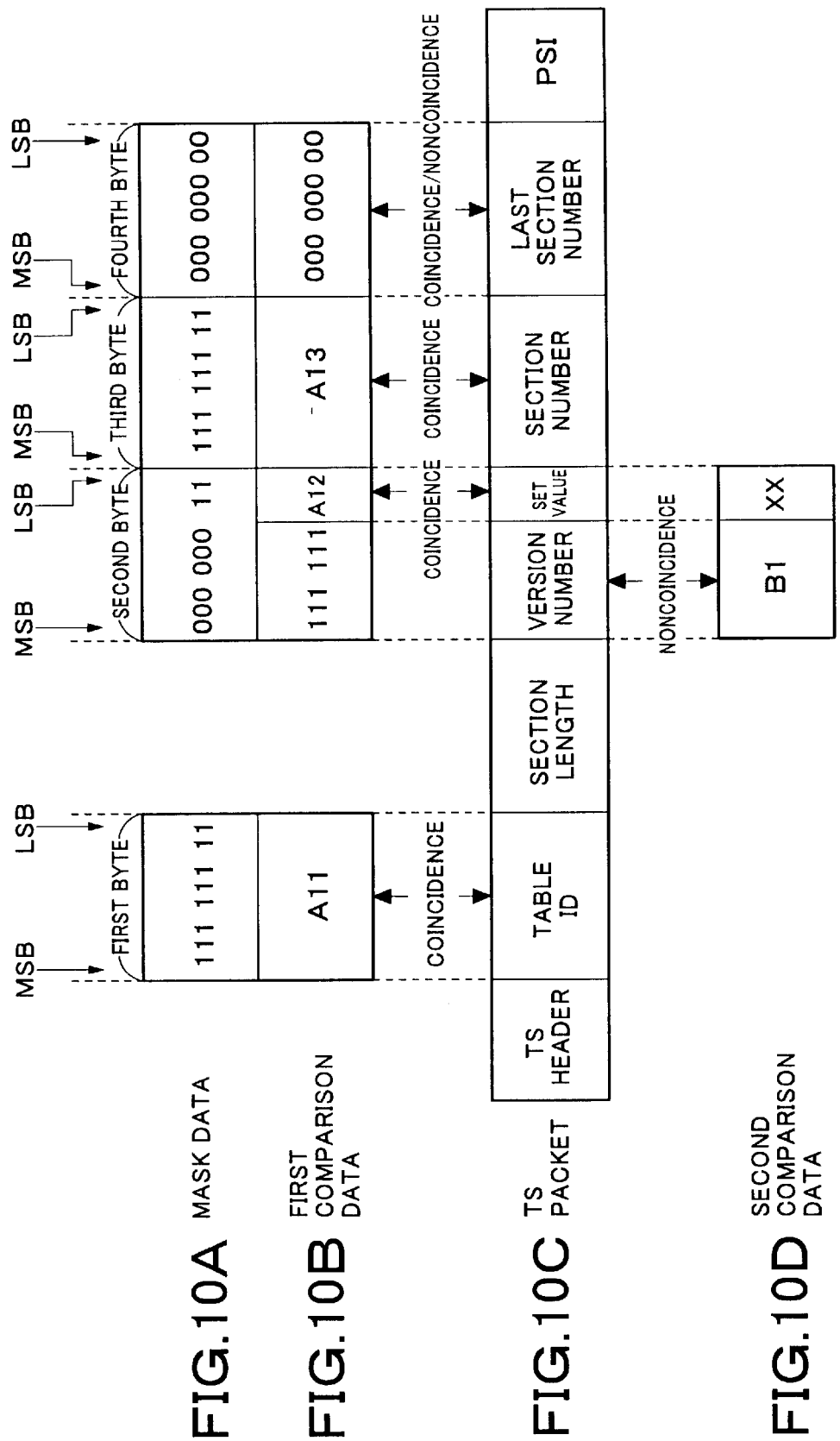

DEMULTIPLEXER

BACKGROUND OF THE INVENTION

1. Field of the Invention

The present invention relates to a demultiplexer for extracting specific individual data from among packets in which the specific individual data is stored in predetermined units.

2. Description of the Related Art

In a digital broadcast system, a transmitter side generates, multiplexes, and transmits a plurality of programs worth of transport stream (TS) packets and TS packets in which program specific information (PSI) for extracting TS packets of an intended program are stored according to the Moving Picture Experts Group Phase 2 (MPEG2) standard. The PSI is additional information of image data and audio data.

A receiver side extracts the TS packets of the program designated by a user based on the PSI and packet identification numbers of the TS packets, decodes the encoded data of the image and audio stored in the extracted TS packets, and outputs the image and audio based on the decoded data of the image and audio.

The PSI includes a region program map table (PMT), a conditional access table (CAT), a network information table (NIT), a program association table (PAT), etc.

Summarizing the disadvantages to be solved by the invention, FIG. 1 is a schematic block configuration diagram of an example of the receiver.

This receiver 100 has a demultiplexer 10, a first decoder 21, a second decoder 22, and a central processing unit (CPU) 30.

The receiver 100 is supplied with a data train D10 comprised by a plurality of packets. The plurality of packets have first to third packets in which individual data is stored in predetermined units stored in data regions. Predetermined units of encoded image data are stored in the data region of the first packet, while control data corresponding to the related encoded image data and/or the related first packet are stored in a header region. Predetermined units of encoded audio data are stored in the data region of the second packet, while control data corresponding to the related audio data and/or the related second packet are stored in a header region. Additional information of the encoded image data and/or the encoded audio data are stored in the data region of the third packet, while control data corresponding to the related additional information and/or the related third packet are stored in the header region.

The demultiplexer 10 is supplied with the data train D10, demultiplexes the first packet from the data train D10 to extract encoded image data D1 from the related first packet, and supplies the extracted encoded image data D1 to the first decoder 21.

The first decoder 21 decodes the encoded image data D1 to generate a decoded image data D6 and outputs the generated decoded image data D6 to a display device 51. The display device 51 displays the image of the decoded image data D6 on a display screen.

Further, the demultiplexer 10 demultiplexes the second packet from the data train D10 to extract encoded audio data D2 from the related second packet and supplies the extracted encoded audio data D2 to the second decoder 22.

The second decoder 22 decodes the encoded audio data D2 to generate decoded audio data D7 and outputs the generated decoded audio data D7 to a speaker 52. The speaker 52 audio outputs the decoded audio data D7.

Further, the demultiplexer 10 demultiplexes the third packet from the data train D10 and supplies an additional information D3 from the related third packet to the CPU 30.

The CPU 30 is a controller for overall control of the receiver 100. This CPU 30 generates control signals C1 to C3, supplies the control signal C1 to the first decoder 21, supplies the control signal C2 to the second decoder 22, and supplies the control signal C3 to the demultiplexer 10.

The CPU 30 controls the demultiplexer 10 to demultiplex the first packet and extract the encoded image data D1 by the control signal C3 based on the additional information D3 from the demultiplexer 10.

Further, the CPU 30 controls the demultiplexer 10 to demultiplex the second packet and extract the encoded audio data D2 by the control signal C3 and controls the demultiplexer 10 to demultiplex the third packet and extracts the additional information D3.

FIG. 2 is a schematic block diagram of an example of the configuration of the demultiplexer 10 provided in the receiver 100 of FIG. 1.

This demultiplexer 10 has a packet demultiplexing means 19, a first extractor 11, a second extractor 12, and a third extractor 13. The packet demultiplexing means 19 and the first to third extractors 11 to 13 are controlled by the control signal C3 from the CPU 30.

The packet demultiplexing means 19 receives as input the data train D10, demultiplexes the data train D10 into first to third packets D11 to D13, supplies the first packet D11 to the first extractor 11, supplies the second packet D12 to the second extractor 12, and supplies the third packet D13 to the third extractor 13.

The first extractor 11 extracts the encoded image data D1 from the first packet D11 from the packet demultiplexing means 19 and outputs the extracted encoded image data D1 to the first decoder 21.

The second extractor 12 extracts the encoded audio data D2 from the second packet D12 from the packet demultiplexing means 19 and outputs the extracted encoded audio data D2 to the second decoder 22.

The third extractor 13 extracts the additional information D3 from the third packet D13 from the packet demultiplexing means 19 and outputs the extracted additional information D3 to the CPU 30.

The third extractor 13 has an extracting means 14, a header processing means 15, a memory 16, and a detecting means 40.

The extracting means 14 temporarily holds the third packet D13 from the demultiplexing means 19.

The header processing means 15 supplies control data D15 stored in the header region of the third packet D13 to the detecting means 40.

The memory 16 stores comparison data C16 and mask data M16 corresponding to the control data D15 and supplies the comparison data C16 and the mask data M16 to the detecting means 40.

The detecting means 40 compares the control data D15 from the header processing means 15 and the comparison data C16 from the memory 16 based on the mask data M16 and outputs detection signal D40 to the extracting means 14 when the result of comparison indicates coincidence.

The extracting means 14 extracts the additional information D3 from the third packet D13 held by the related extracting means 14 based on the detection signal D40 from the detecting means 40 and outputs the extracted additional information D3 to the CPU 30.

FIG. 3 is a schematic block diagram of an example of the configuration of the detecting means 40 provided in the demultiplexer 10 of FIG. 2.

This detecting means 40 has registers 41 to 43, a controlling means 44, an EX-OR circuit 45, an AND circuit 46, and an OR circuit 47.

The register 41 is supplied with and holds 8 bits of the control data D15 from the header processing means 15.

The register 42 is supplied with and holds 8 bits of the comparison data C16 from the memory 16.

The register 43 is supplied with and holds 8 bits of the mask data M16 from the memory 16.

The controlling means 44 supplies address data D16 to the memory 16, whereby the comparison data C16 and the mask data M16 corresponding to the address data D16 are supplied from the memory 16 to the registers 42 and 43. Further, the controlling means 44 controls a latch operation of the registers 41 to 43.

The control data D15 held in the register 41 and the comparison data C16 held in the register 42 are compared for every composing bit at the EX-OR circuit 45.

The AND logic of the output value of the EX-OR circuit 45 and the mask bit comprising the mask data M16 held in the register 43 is found at the AND circuit 46 for masking.

The OR logic of the output values of the AND circuit 46 is found at the OR circuit 47. When all bits coincide for an unmasked portion, the OR circuit 47 generates the detection signal D40 and outputs it to the extracting means 14.

Note that where the comparison of the control data and the comparison data is carried out for a plurality of bytes, use is made of a plurality of detecting means 40 corresponding to the plurality of bytes or use is made of a detecting means 40 in a time division manner corresponding to the plurality of bytes, and the detection signal D40 is output where they coincide for the related plurality of bytes.

FIG. 4 is an explanatory diagram of an example of the configuration of a data table of the mask data and the comparison data.

The mask data and the comparison data are classified into first to m-th condition data. Further, each of the first to the m-th condition data is divided into a first byte to n-th byte. By detecting coincidence of the comparison portions for the first byte to the n-th byte, it becomes possible to detect one type of packet among m types of the third packets. Note that m and n are integers of 2 or more.

When there are n bytes of the control data D15 for comparison as the control data contained in the third packet D13 and to be held in the register 41, it can be detected that the third packet D13 is a packet corresponding to the related condition data when the comparison shows complete coincidence for the unmasked portions for the first byte to the n-th byte.

In the demultiplexer 10, the additional information of the third packet matching the condition data is extracted again and supplied to the CPU even if it is an identical value to the additional information extracted at a previous time. For this reason, the demultiplexing of the demultiplexer 10 is redundant, and the processing load of the CPU 30 is large.

As an example, the control data in the header region of the third packet is sometimes provided with version number information indicating the version of the additional information of the image data in the first packet and/or the audio data in the second packet. The additional information is an example of the specific individual data.

In the third packet, when the version number information is identical and the additional information of the data region is identical, if the portion of the version number information is masked and excluded from the comparison, the identical additional information is supplied to the CPU 30 again, so the load of the signal processing of the CPU 30 becomes large.

SUMMARY OF THE INVENTION

An object of the present invention is to provide a demultiplexer capable of extracting specific individual data from packets in which the specific individual data is stored in predetermined units with a high efficiency.

To attain the above object, according to the present invention, there is provided a demultiplexer which is sequentially input with packets in which specific individual data is stored in predetermined units and extracts the specific individual data from the input packets, each packet comprised of predetermined units of specific individual data and control data corresponding to the related specific individual data and/or the related packet, said demultiplexer comprising: a first comparing means for comparing the control data in an input packet and first comparison data corresponding to a first predetermined portion of the related control data based on a mask bit corresponding to a composing bit of the related first comparison data, the first comparing means comparing portions corresponding to a mask bit having an unmasking value; a second comparing means for comparing the control data in an input packet and second comparison data corresponding to a second predetermined portion contained in the first predetermined portion of the related control data based on the first comparison data and the mask bit, the second comparing means comparing portions corresponding to a mask bit having a masking value and corresponding to composing bits having a first value; and an extracting means for extracting the predetermined units of the specific individual data from an input packet when a result of comparison of the first comparing means indicates coincidence and the result of comparison of the second comparing means indicates noncoincidence.

In the demultiplexer according to the present invention, preferably the first comparing means compares portions corresponding to a mask bit having a masking value among the control data and the first comparison data, and wherein said demultiplex further comprises a setting means for setting the result of comparison of the first comparing means for the related portions to indicate coincidence.

In the demultiplexer according to the present invention, preferably provision is further made of a storing means for storing a plurality of second comparison data in order, and a selecting means for selecting second comparison data of a predetermined order from the storing means and supplying the same to the second comparing means. The selecting means selects the second comparison data of the next order with respect to the predetermined order when the result of comparison of the first comparing means indicates coincidence and the result of comparison of the second comparing means indicates noncoincidence.

In the demultiplexer according to the present invention, more preferably, when the result of comparison of the first comparing means indicates coincidence and the result of comparison of the second comparing means indicates noncoincidence, the comparison portion of the control data indicated as noncoincidence by the second comparing means and the comparison portion of the second comparison data having the next order are the same value.

In the demultiplexer according to the present invention, preferably provision is further made of a packet demultiplexing means for demultiplexing a packet in which specific individual data is stored from a data train comprised of a plurality of individual data multiplexed in the form of packets in predetermined units and supplying the same to the extracting means; and a processing means for extracting the control data from the packet demultiplexed by the packet demultiplexing means and supplying the same to the first and second comparing means.

In the demultiplexer according to the present invention, it is also possible to employ a structure wherein, for example, the plurality of individual data are comprised by image data, audio data, and additional information of the image data and/or audio data, wherein the specific individual data is the additional information, and wherein the packet demultiplexing means demultiplexes the data train into packets in which the predetermined units of the image data are stored, packets in which predetermined units of the audio data are stored, and packets in which predetermined units of the additional information are stored.

In the demultiplexer according to the present invention, it is also possible to employ a structure wherein for example the control data in a packet is comprised by identification information of the specific individual data stored in the related packet and version number information indicating the version of the specific individual data stored in the related packet, wherein the mask bit corresponding to the portion of the identification information in the control data has an unmasking value, the first comparison data corresponding to the portion of the identification information has identification information of the specific individual data, and wherein the mask bit corresponding to the portion of the version number information in the control data has a masking value, and the composing bit of the first comparison data corresponding to the portion of the version number information has a first value.

The first comparing means compares the control data and the first comparison data for portions corresponding to a mask bit having an unmasking value.

The second comparing means compares the control data and the second comparison data for portions corresponding to a mask bit having a masking value and corresponding to a composing bit having the first value.

The extracting means extracts the predetermined units of specific individual data from an input packet when the result of comparison of the first comparing means indicates coincidence and the result of comparison of the second comparing means indicates noncoincidence.

In this way, in the demultiplexer according to the present invention, since provision is made of the second comparing means for comparing the control data and the second comparison data based on the mask bit and the first comparison data and since the additional information is demultiplexed when the portions corresponding to a mask bit having a masking value are different from each other, it is possible to prevent demultiplexing when the related portions coincide with each other and prevent redundancy of demultiplexing.

BRIEF DESCRIPTION OF THE DRAWINGS

These and other objects and features of the present invention will be more apparent from the following description of the preferred embodiments given with reference to the accompanying drawings, wherein:

FIG. 4 is an explanatory diagram of an example of the configuration of a data table of mask data and comparison data;

FIG. 7 is an explanatory diagram of an example of the configuration of the data table of the mask data and first comparison data;

FIGS. 9A to 9C are explanatory diagrams of a comparison operation of the detecting means of FIG. 3 and the comparison operation of the detecting means of FIG. 6; and FIGS. 10A to 10D are explanatory diagrams of the comparison operation in the detecting means of FIG. 6.

DESCRIPTION OF THE PREFERRED EMBODIMENTS

Below, an explanation will be given of an embodiment of the present invention with reference to the attached drawings.

Figure 5:
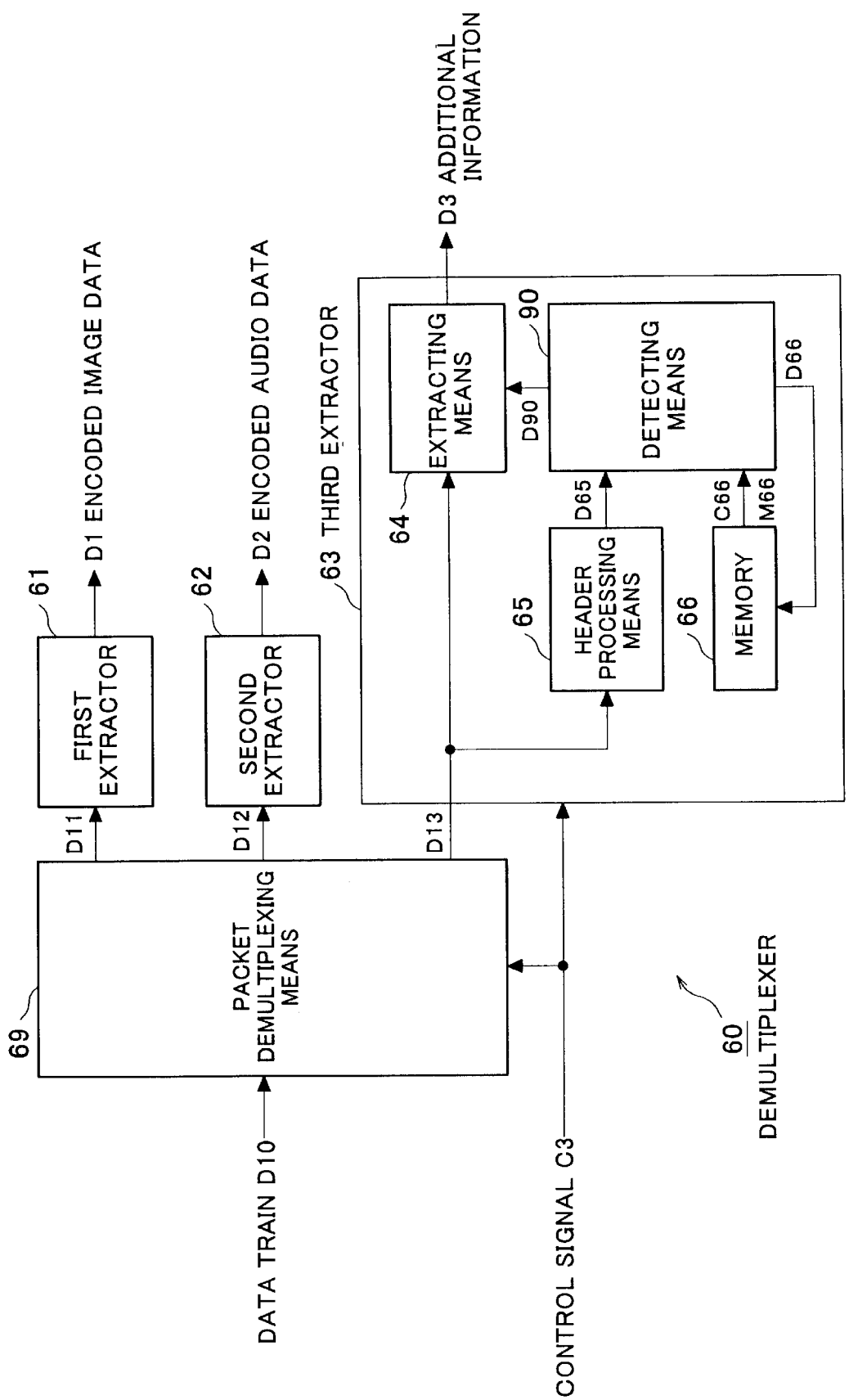
FIG. 5 is a schematic block diagram of an embodiment of the demultiplexer according to the present invention.

FIG. 5 is a schematic block diagram of an embodiment of the demultiplexer according to the present invention.

This demultiplexer 60 is provided in for example a receiver and supplied with a data train D10 comprised of a plurality of packets.

The plurality of packets have first to third packets in which predetermined units of individual data are stored in data regions.

Predetermined units of encoded image data are stored in the data region of the first packet, while control data corresponding to the related encoded image data and/or the related first packet are stored in the header region.

Predetermined units of the encoded audio data are stored in the data region of the second packet, while control data corresponding to the related audio data and/or the related second packet are stored in the header region.

The additional information of the encoded image data and/or the encoded audio data are stored in the data region of the third packet, while the control data corresponding to the related additional information and/or the related third packet are stored in the header region.

The demultiplexer 60 is supplied with the data train D10, demultiplexes the first packet from the data train D10, and extracts the encoded image data D1 from the related first packet.

Further, the demultiplexer 60 demultiplexes the second packet from the data train D10 and extracts the encoded audio data D2 from the related second packet.

Further, the demultiplexer 60 demultiplexes the third packet from the data train D10, extracts the additional information D3 from the related third packet, and supplies the extracted additional information D3 to the CPU in the receiver.

The CPU is a controller for overall control of the receiver, generates a control signal C3 based on the additional information D3 from the demultiplexer 60, and controls the demultiplexer 60 to demultiplex the first packet and extract the encoded image data D1 by this control signal C3.

Further, by the control signal C3, the CPU controls the demultiplexer 60 to demultiplex the second packet and extract the encoded audio data D2 and control the demultiplexer 60 to demultiplex the third packet and extract the additional information D3.

The demultiplexer 60 comprises a packet demultiplexing means 69, a first extractor 61, a second extractor 62, and a third extractor 63. The packet demultiplexing means 69 and the first to third extractors 61 to 63 are controlled by the control signal C3 from the CPU.

The packet demultiplexing means 69 is input with the data train D10, demultiplexes the data train D10 into first to third packets D11 to D13, supplies the first packet D11 to the first extractor 61, supplies the second packet D12 to the second extractor 62, and supplies the third packet D13 to the third extractor 63.

The first extractor 61 extracts the encoded image data D1 from the first packet D11 from the packet demultiplexing means 69.

The second extractor 62 extracts the encoded audio data D2 from the second packet D12 from the packet demultiplexing means 69.

The third extractor 63 extracts the additional information D3 from the third packet D13 from the packet demultiplexing means 69 and outputs this additional information D3 to the CPU.

The third extractor 63 has an extracting means 64, a header processing means 65, a memory 66, and a detecting means 90.

The extracting means 64 temporarily holds the third packet D13 from the packet demultiplexing means 69.

The header processing means 65 supplies control data D65 stored in the header region of the third packet D13 to the detecting means 90.

The memory 66 stores first comparison data C66 and mask data M66 corresponding to the first predetermined portion of the control data and supplies the first comparison data C66 and the mask data M66 to the detecting means 90.

The detecting means 90 compares the control data D65 from the header processing means 65 and the first comparison data C66 from the memory 66 based on the mask data M16.

Further, it compares the control data D65 from the header processing means 65 and the second comparison data B66 corresponding to the second predetermined portion contained in the first predetermined portion of the control data based on the first comparison data C66 and the mask data M66.

The detecting means 90 outputs a detection signal D90 to the extracting means 64 when the result of comparison of the control data D65 and the first comparison data C66 indicates coincidence and the result of comparison of the control data D65 and the second comparison data B66 indicates noncoincidence as will be mentioned later.

The extracting means 64 extracts the additional information D3 from the third packet D13 held by the related extracting means 64 based on the detection signal D90 from the detecting means 90 and outputs the extracted additional information D3 to the CPU.

Figure 6:
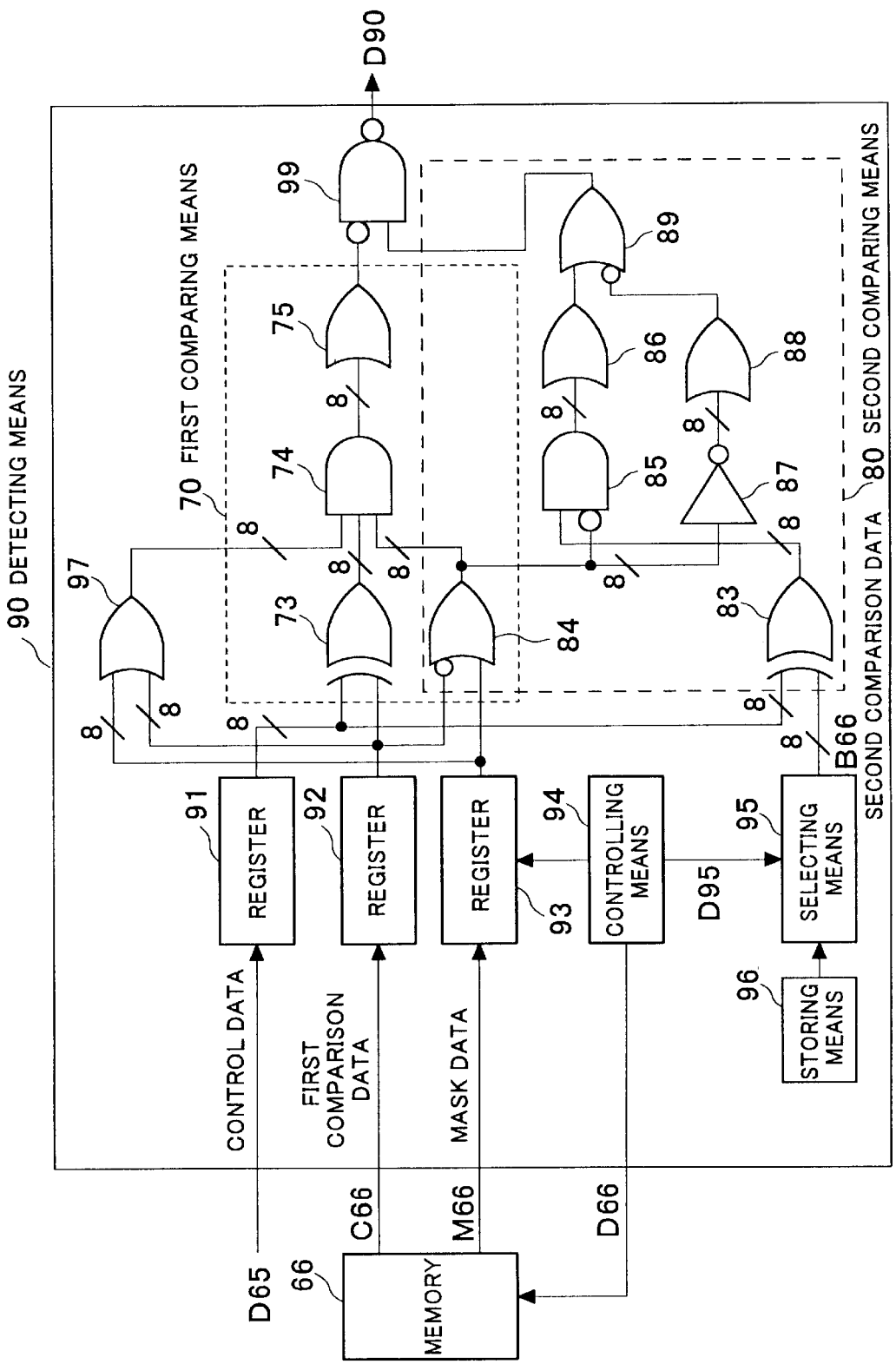
FIG. 6 is a schematic block diagram of an example of the configuration of the detecting means provided in the demultiplexer of FIG. 5.

FIG. 6 is a schematic block diagram of an example of the configuration of the detecting means 90 provided in the demultiplexer 60 of FIG. 5.

This detecting means 90 has registers 91 to 93, a controlling means 94, a selecting means 95, a storing means 96, an OR circuit 97, an AND circuit 99, a first comparing means 70, and a second comparing means 80.

The first comparing means 70 has an EX-OR circuit 73, an AND circuit 74, an OR circuit 75, and an OR circuit 84.

The second comparing means 80 has an EX-OR circuit 83, an OR circuit 84, an AND circuit 85, an OR circuit 86, an inversion circuit 87, an OR circuit 88, and an OR circuit 89.

The register 91 is supplied with and holds 8 bits of the control data D65 from the header processing means 65.

The register 92 is supplied with and holds 8 bits of the first comparison data C66 from the memory 66.

The register 93 is supplied with and holds 8 bits of the mask data M66 from the memory 66.

The controlling means 94 supplies address data D66 to the memory 66, whereby the first comparison data C66 and the mask data M66 corresponding to the address data D66 are supplied from the memory 66 to the registers 92 and 93. Further, the controlling means 94 controls the latch operation of the registers 91 to 93.

The control data D65 held in the register 91 and the comparison data C66 held in the register 92 are compared for every composing bit at the EX-OR circuit 73.

The OR logic of the first comparison data C66 held in the register 92 and the mask data M66 held in the register 93 is found at the OR circuit 97 for every composing bit. When the composing bit of the first comparison data C66 and the mask bit comprising the mask data M66 are both 0, the output of the corresponding portion becomes a logic 0, and the output of the other portions becomes a logic 1.

The OR logic of the inverted value of the first comparison data C66 held in the register 92 and the mask data M66 held in the register 93 is found at the OR circuit 84 for every composing bit. When the mask bit has the logic 0 and the composing bit of the first comparison data C66 has the logic 1, the output of the corresponding portion becomes the logic 0 and the output of the other portions becomes the logic 1.

The AND circuit 74 finds the AND logic of the output value of the OR circuit 97, the output value of the EX-OR circuit 73, and the output value of the OR circuit 84.

Since the output value of the OR circuit 97 is input, when the mask bit and the composing bit of the first comparison data C66 both have the logic 0, the portion corresponding to the related mask bit is masked.

Further, since the output value of the OR circuit 84 is input, when the mask bit has the logic 0 and the composing bit of the first comparison data C66 has the logic 1, the portion corresponding to the related mask bit is masked.

The OR circuit 75 finds the OR logic of the output values of the AND circuit 74, outputs the logic 0 when the comparisons of the unmasked portions, that is, the portions corresponding to a mask bit having an unmasking value, that is, a logic 1, indicate all coincidence, and outputs the logic 1 where they indicate noncoincidence.

The storing means 96 stores a plurality of second comparison data and supplies the plurality of second comparison data to the selecting means 95.

The selecting means selects the specific second comparison data B66 from among the plurality of second comparison data based on a selection signal D95 from the controlling means 94 and supplies the same to the EX-OR circuit 83.

The EX-OR circuit 83 compares the second comparison data B66 and the control data D65 held in the register 91 for every composing bit.

The AND circuit 85 finds the AND logic of the output value of the EX-OR circuit 83 and the inverted value of the output of the OR circuit 84.

Since the inverted value of the output of the OR circuit 84 is input, when the mask bit has the masking value, that is, the logic 0, and the composing bit of the first comparison data corresponding to the related mask bit has the logic 1, the operation result of the portion corresponding to the related mask bit is extracted.

The OR logic of the output values of the AND circuit 85 is found at the OR circuit 86. The logic 1 is output from the OR circuit 86 when there is noncoincidence for the extracted portions, while the logic 0 is output from the OR circuit 86 when there is coincidence.

The inversion circuit 87 inverts the output value of the OR circuit 84 and outputs the same.

The OR circuit 88 finds the OR logic of the output values of the inversion circuit 87, outputs the logic 1 when there is a portion where the mask bit has the logic 0 and the composing bit of the first comparison data corresponding to the related mask data has the logic 1, while outputs the logic 0 where there is no such portion.

The OR circuit 89 finds the OR logic of the output value of the OR circuit 86 and the inverted value of the output of the OR circuit 88 and outputs the same.

The AND circuit 99 finds the AND logic of the inverted value of the output of the OR circuit 75 and the output value of the OR circuit 89 and outputs the inverted value of the operation result.

The AND circuit 99 outputs the logic 0 as the detection signal D90 when the output value of the OR circuit 75 is the logic 0 and the output value of the OR circuit 89 is the logic 1.

Here, a case where the output value of the OR circuit 75 is the logic 0 corresponds to the case where the comparisons of the portions corresponding to a mask bit having a logic 1 indicate all coincidence and a case where the result of comparison of the first comparing means 70 indicates coincidence.

Further, the first case where the output value of the OR circuit 89 becomes the logic 1 corresponds to the case where the mask bit is the logic 0, the composing bit of the first comparison data corresponding to the related mask bit is the logic 1, there is a noncoincidence portion in the comparison of the portions corresponding to the related mask bit, and the second comparing means 80 indicates noncoincidence. The second case is the case where there is no portion where the mask bit is the logic 0 and the composing bit of the first comparison data corresponding to the related mask bit is the logic 1.

In this way, the first comparing means 70 compares the control data D65 and the first comparison data C66 based on the mask data M66 having a mask bit corresponding to the composing bit of the first comparison data C66. This first comparing means 70 compares the portions corresponding to the mask bit having the unmasking value, that is, the logic 1.

Further, the first comparing means 70 compares the portions corresponding to a mask bit having the masking value, that is, the logic 0, among the control data D65 and the first comparison data C66. The OR circuits 97 and 84 comprise a setting means for setting the result of comparison of the first comparing means 70 for the related portions to indicate coincidence.

Further, the second comparing means 80 compares the control data D65 and the second comparison data B66 based on the first comparison data C66 and the mask data M66. This second comparing means 80 compares the portions corresponding to a mask bit having the masking value, that is, the logic 0, and corresponding to a composing bit having a first value, that is, the logic 1, among the composing bits of the first comparison data C66.

Note that, it is also possible to employ a configuration wherein the storing means 96 stores a plurality of second comparison data in order, and the selecting means 95 selects the second comparison data B66 of the predetermined order from the storing means 96 and supplies the same to the second comparing means 80.

It is also possible to employ a configuration wherein the selecting means 95 selects the second comparison data of the next order with respect to the predetermined order when the result of comparison of the first comparing means 70 indicates coincidence and the result of comparison of the second comparing means 80 indicates noncoincidence.

Further, it is also possible if the comparison portion of the control data indicated as noncoincidence by the second comparing means 80 and the comparison portion of the second comparison data having the next order are given the same value when the result of comparison of the first comparing means 70 indicates coincidence and the result of comparison of the second comparing means 80 indicates noncoincidence. It is also possible to employ a configuration where the CPU writes .comparison portions of the related control data into the storing means 96.

Further, it is also possible to employ a configuration where the comparison of the control data D65 with the first and/or second comparison data is carried out for a plurality of bytes, use is made of a plurality of detecting means 90 corresponding to the related plurality of bytes, or use is made of the detecting means 90 in a time division manner corresponding to the related plurality of bytes, and the detection signal D90 is output when the predetermined result is obtained for the related plurality of bytes. The predetermined result is for example the case where the inverted values of the outputs of the AND circuit 99 corresponding to the plurality of bytes become all logic 0.

FIG. 7 is an explanatory view of an example of the configuration of a data table of the mask data and the first comparison data. The plurality of mask data and the plurality of first comparison data are stored in the memory 66.

The mask data and the first comparison data are classified into the first to the m-th condition data. Further, each of the first to the m-th condition data is divided into a first byte to n-th byte. By detecting coincidence of the comparison portions for the first byte to the n-th byte, the detecting means 90 can detect one type of packet among m types of the third packets. Note that, m and n are integers of 2 or more.

For example, when there are n bytes of the control data D15 for comparison as the control data contained in the third packet D13 and to be held in the register 91, the detecting means 90 can detect that the third packet D13 is the packet corresponding to the related condition data when the comparisons indicate all coincidence for the unmasked portions for the first byte to the n-th byte.

Figure 8:
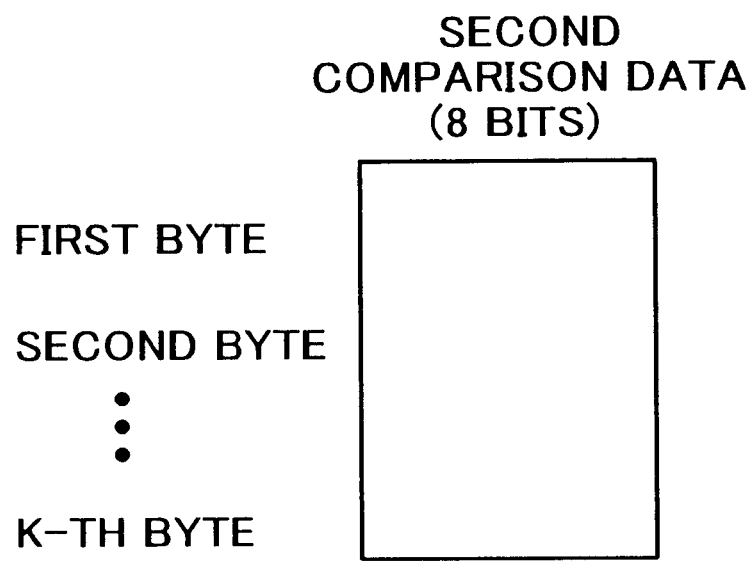
FIG. 8 is an explanatory diagram of an example of the configuration of the data table of second comparison data.

FIG. 8 is an explanatory view of an example of the configuration of the data table of the second comparison data.

It is divided into a first byte to k-th byte. By selecting one of the first byte to the k-th byte by the selection signal D95 and detecting noncoincidence of the comparison portions, overlapping extraction of the identical additional information D3 from among a plurality of third packets D13 at the third extracting means 63 is prevented. Note that, k is an integer of 2 or more. The first byte to the k-th byte may also be made the priority order for storing the second comparison data.

Figure 1:
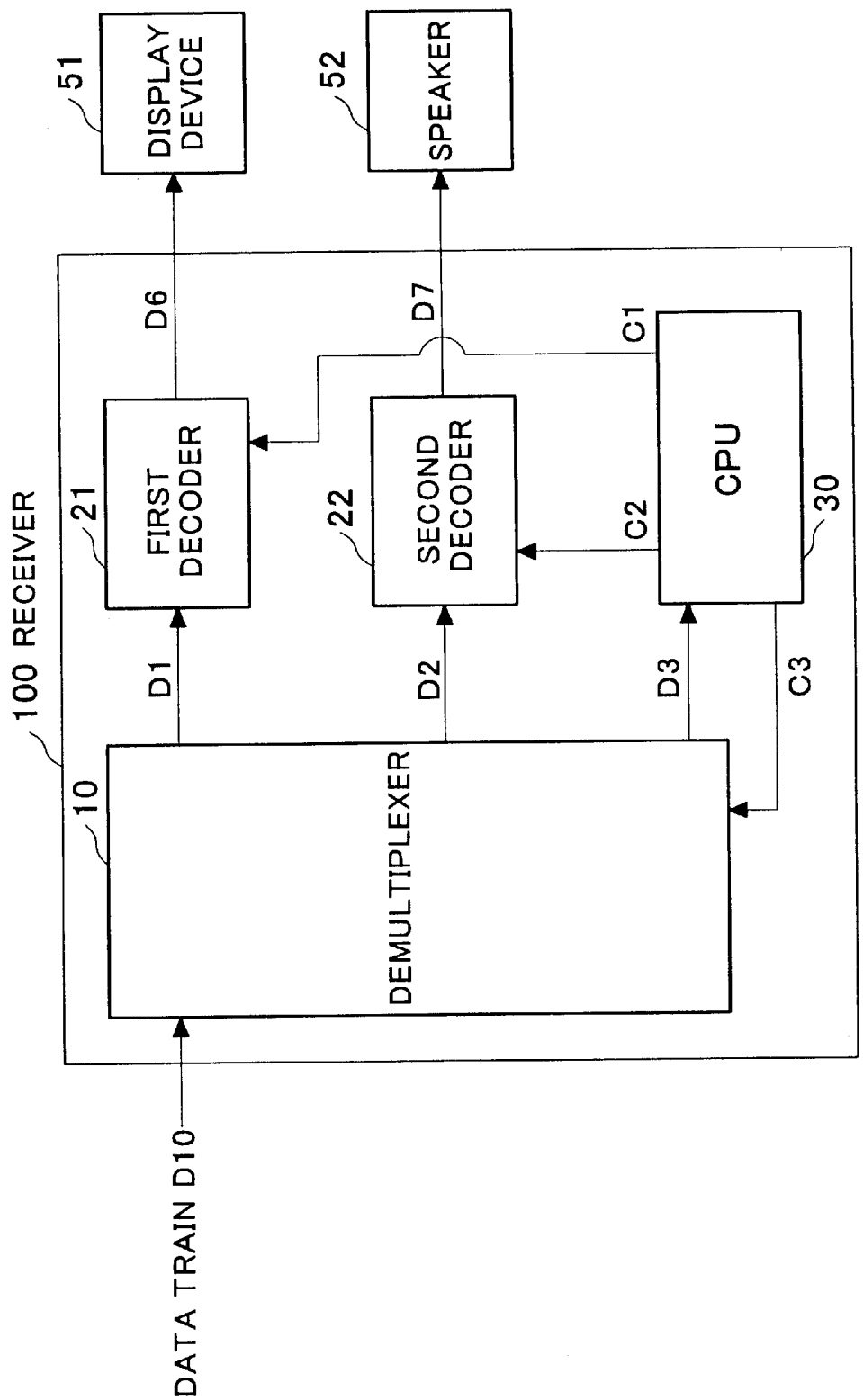
FIG. 1 is a schematic block diagram of example of a receiver.
Figure 2:
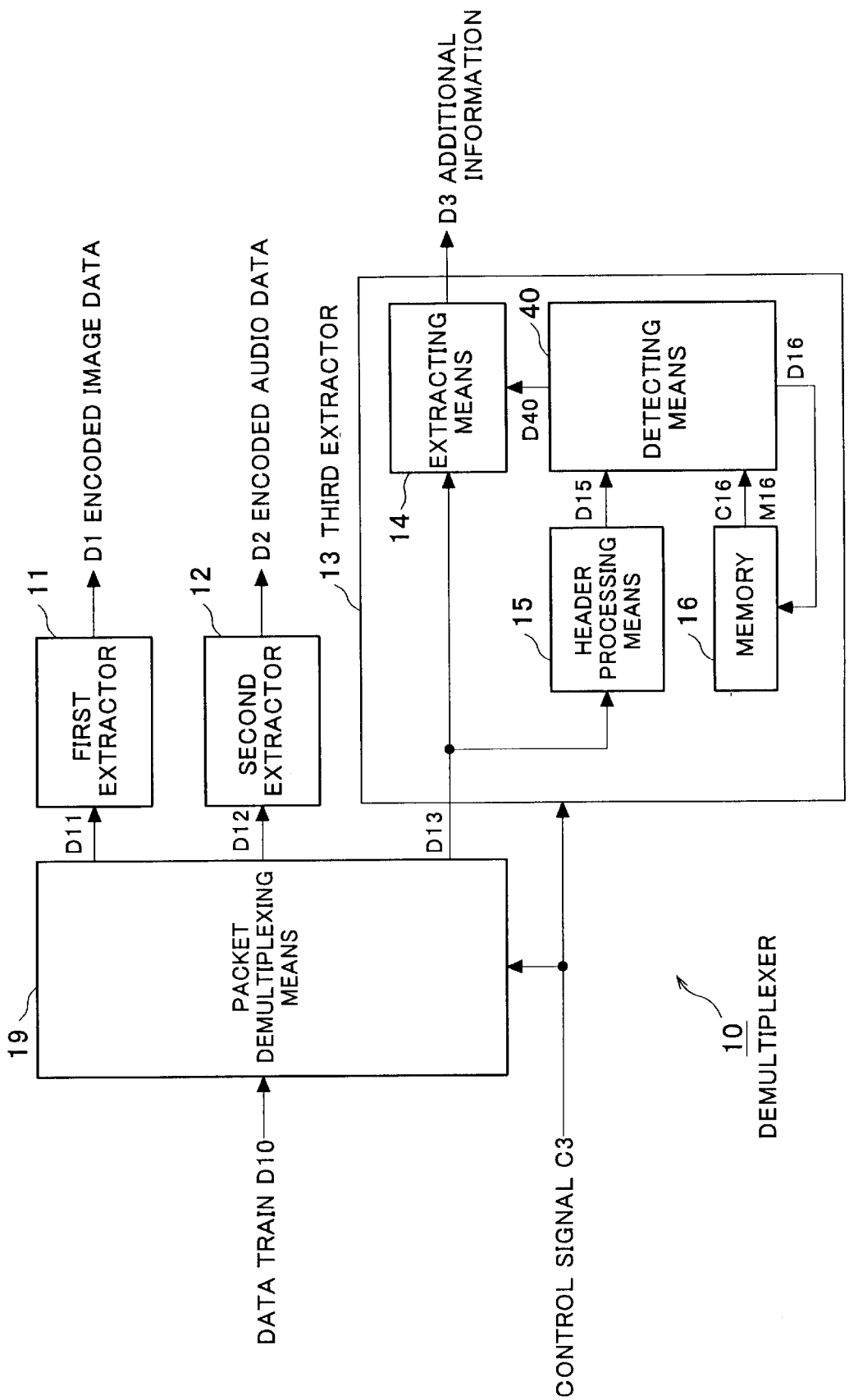
FIG. 2 is a schematic block diagram of an example of the configuration of a demultiplexer provided in the receiver of FIG. 1 and shows an example of the configuration of the demultiplexer according to the present invention.
Figure 3:
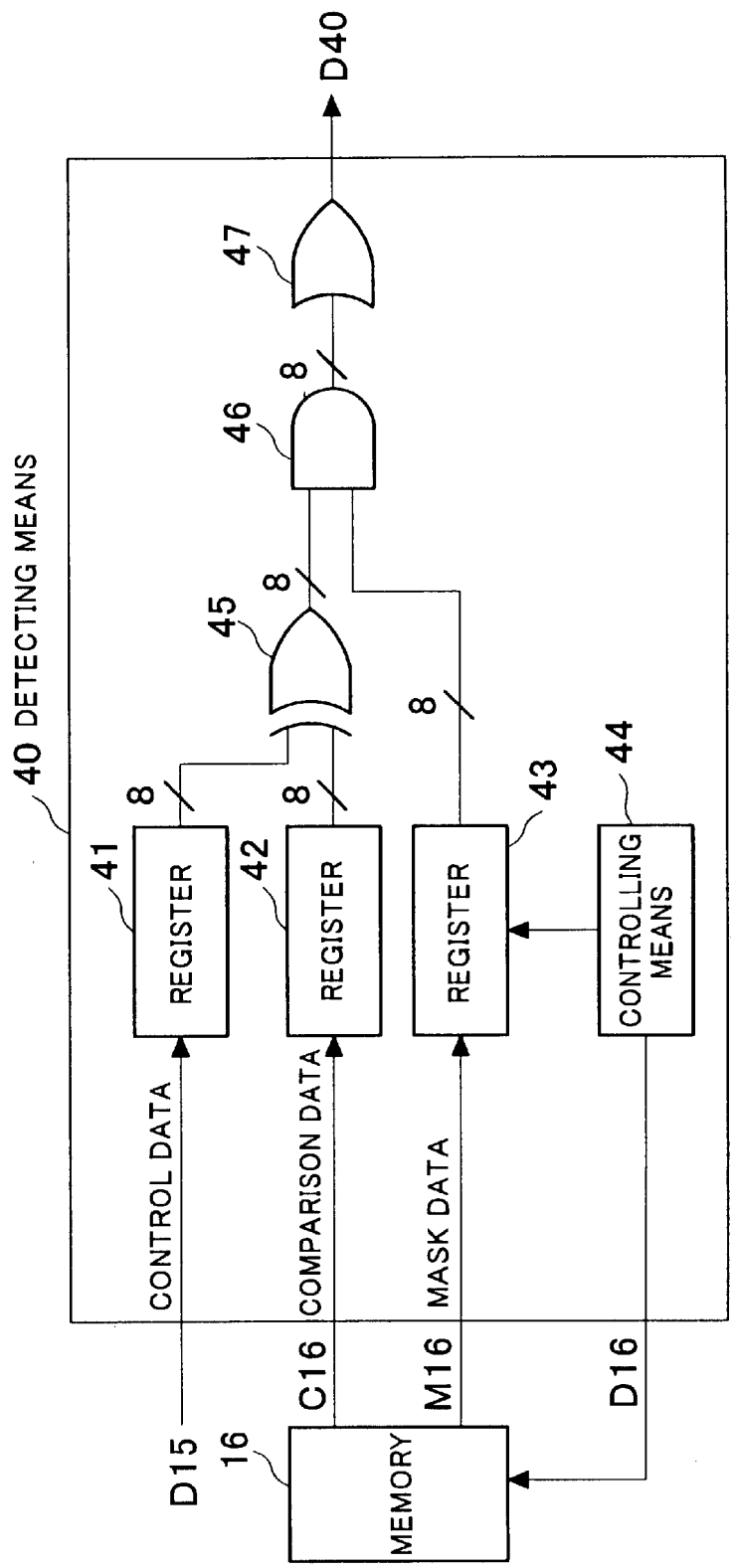
FIG. 3 is a schematic block diagram of an example of the configuration of a detecting means provided in the demultiplexer of FIG. 2.

FIGS. 9A to 9C, are explanatory views of the comparison operation of the detecting means 40 shown in FIG. 3 and the comparison operation of the detecting means 90 shown in FIG. 6. MSB in the figure indicates the most significant bit, while LSB indicates the least significant bit.

FIG. 9A is an explanatory view of the comparison operation of the detecting means 40 shown in FIG. 3.

FIGS. 9B and 9C are explanatory views of the comparison operation of the detecting means 90 shown in FIG. 6.

In FIG. 9A, the value of the mask data is "00000011", the value of the comparison data is "11111101", and the value of the control data is "10101101".

The upper significant 6 bits of the mask data are the logic 0 or masking values. The lower significant 2 bits of the mask data are the logic 1 or unmasking values. For this reason, portions corresponding to the mask bit of the logic 1 (that is the lower significant 2 bits) among the comparison data and the control data are compared with each other, and the detecting means 40 detects whether or not the result of comparison indicates coincidence.

In FIG. 9B, the value of the mask data is "00000011", the value of the first comparison data is "11111101", the value of the control data is "10101101", and the value of the second comparison data is "101010XX". Note that, X is any value between 1 and 0.

The upper significant 6 bits of the mask data are the logic 0 or the masking value. The lower significant 2 bits of the mask data are the logic 1 or the unmasking value. For this reason, portions corresponding to the mask bit of the logic 1 (that is the lower significant 2 bits) among the first comparison data and the control data are compared with each other. The first comparing means 70 in the detecting means 90 detects whether or not the result of comparison indicates coincidence.

Further, among the second comparison data and the control data, the portions corresponding to a mask bit of the logic 0 and corresponding to the composing bits of the logic 1 among the composing bits of the first comparison data (that is the upper significant 6 bits) are compared with each other. The second comparing means 80 in the detecting means 90 detects whether or not the result of comparison indicates noncoincidence.

In FIG. 9C, the value of the mask data is "00000011", the value of the first comparison data is "00111101", the value of the control data is "10101101", and the value of the second comparison data is The upper significant 6 bits of the mask data are the logic 0 or the masking value. The lower significant 2 bits of the mask data are the logic 1 or the unmasking value. For this reason, portions corresponding to a mask bit of the logic 1 (that is the lower significant 2 bits) among the first comparison data and the control data are compared with each other. The first comparing means 70 in the detecting means 90 detects whether or not the result of comparison indicates coincidence.

Further, among the second comparison data and the control data, the portions corresponding to a mask bit of the logic 0 and corresponding to the composing bits of the logic 1 among the composing bits of the first comparison data (that is, where the most significant bits are the first bit, third bits, fourth bits, fifth bits, and sixth bits) are compared with each other. The second comparing means 80 in the detecting means 90 detects whether or not the result of comparison indicates noncoincidence.

FIGS. 10A to 10D are explanatory views of the comparison operation in the detecting means 90 shown in FIG. 6. FIG. 10A illustrates the first to the fifth bytes of the mask data. FIG. 10B illustrates the first to the fifth bytes of the first comparison data. FIG. 10C illustrates a section format of the TS packet. FIG. 10D illustrates the second comparison data.

The header region of the TS packet is for storing a TS header having the packet identification number, table identification information indicating a table identification number (table ID) corresponding to the type of the PSI stored in the TS packet, data length information indicating the data length (section length) of the related PSI stored in the data region of the related TS packet, version number information indicating the version number of the related PSI, a set value, section number information indicating the number (section number) of the related TS packet in the related PSI, last section number information indicating the last section number in the related PSI, etc. as the control data.

Note that when a storage region of the table identification information, version number information, set value, section number information, and last section number information in the header region of the TS packet is defined as the first predetermined portion and a storage region of the version number information and the set value is defined as the second predetermined portion, the related second predetermined portion is contained in the first predetermined portion.

In FIGS. 10A too 10D since the mask data of the first byte is "11111111", the first comparing means 70 in the detecting means 90 compares the table ID in the header region of the TS packet and the first comparison data A11 of the first byte and detects whether or not they coincide.

Further, since the mask data of the second byte is "00000011", the first comparing means 70 compares 2 bits of the set value in the header region of the TS packet and a value A12 of the lower significant 2 bits among the first comparison data of the second byte and detects whether or not they coincide.

Further, since the mask data of the third byte is "11111111", the first comparing means 70 compares the section number in the header region of the TS packet and a first comparison data A13 of the third byte and detects whether or not they coincide.

Further, since the mask data of the fourth byte is "00000000", the first comparing means 70 detects that the last section number in the header region of the TS packet and the first comparison data of the fourth byte coincide.

Further, since the upper significant 6 bits of the mask data of the second byte is "000000" and the upper significant 6 bits of the first comparison data is "111111", the second comparing means 80 compares 6 bits of the version number in the header region of the TS packet and the value B1 of the upper significant 6 bits among the second comparison data of the second byte and detects whether or not they do not coincide.

The content of the PSI is changed according to need. In this case, the value of the version number information is incremented by exactly one. Accordingly, by extracting the PSI changed in version number from the TS packet and demultiplexing the intended TS packet at the demultiplexer 60 based on the extracted PSI, the case where the content of the PSI is changed can be quickly coped with.

Summarizing the effects of the invention, as explained above, in the demultiplexer according to the present invention, since provision is made of the second comparing means for comparing the control data and the second comparison data based on the mask bit and the first comparison data and the demultiplexing of the additional information is carried out where the portions corresponding to a mask bit having the masking value are different from each other, it is possible to prevent the redundancy of the demultiplexing.

In this way, according to the present invention, there can be provided a demultiplexer capable of extracting specific individual data from among packets in which specific individual data is stored in predetermined units with a high efficiency.

While the invention has been described by reference to specific embodiments chosen for purposes of illustration, it should be apparent that numerous modifications could be made thereto by those skilled in the art without departing from the basic concept and scope of the invention.

What is claimed is:

1. A demultiplexer which is sequentially input with packets in which specific individual data is stored in predetermined units and extracts the specific individual data from the input packets, each packet comprised of predetermined units of specific individual data and control data corresponding to a related specific individual data and/or a related packet, said demultiplexer comprising:

a first comparing means for comparing the control data in an input packet and first comparison data corresponding to a first predetermined portion of related control data based on a mask bit corresponding to a composing bit of the related first comparison data, the first comparing means comparing portions corresponding to a mask bit having an unmasking value;

a second comparing means for comparing the control data in an input packet and second comparison data corresponding to a second predetermined portion contained in the first predetermined portion of the related control data based on the first comparison data and the mask bit, the second comparing means comparing portions corresponding to a mask bit having a masking value and corresponding to composing bits having a first value; and an extracting means for extracting the predetermined units of the specific individual data from an input packet when a result of comparison of the first comparing means indicates coincidence and the result of comparison of the second comparing means indicates noncoincidence.

2. A demultiplexer as set forth in claim 1, wherein the first comparing means compares portions corresponding to a mask bit having a masking value among the control data and the first comparison data, and wherein said demultiplex further comprises a setting means for setting the result of comparison of the first comparing means for related portions to indicate coincidence.

3. A demultiplexer as set forth in claim 1, further comprising:

a storing means for storing a plurality of second comparison data in order; and a selecting means for selecting second comparison data of a predetermined order from the storing means and supplying the same to the second comparing means, wherein the selecting means selects the second comparison data of a next order with respect to the predetermined order when the result of comparison of the first comparing means indicates coincidence and the result of comparison of the second comparing means indicates noncoincidence.

4. A demultiplexer as set forth in claim 3, wherein, when the results of comparison of the first comparing means indicates coincidence and the result of comparison of the second comparing means indicates noncoincidence, the compared portion of the control data indicated as noncoincidence by the second comparing means and the compared portion of the second comparison data having the next order are the same value.

5. A demultiplexer as set forth in claim 1, further comprising:

a packet demultiplexing means for demultiplexing a packet in which specific individual data is stored from a data train comprised of a plurality of individual data multiplexed in the form of packets in predetermined units and supplying the same to the extracting means; and a processing means for extracting the control data from the packet demultiplexed by the packet demultiplexing means and supplying the same to the first and second comparing means.

6. A demultiplexer as set forth in claim 5, wherein the plurality of individual data are comprised by image data, audio data, and additional information of the image data and/or audio data, wherein the specific individual data is the additional information, and wherein the packet demultiplexing means demultiplexes the data train into packets in which the predetermined units of the image data are stored, packets in which predetermined units of the audio data are stored, and packets in which predetermined units of the additional information are stored.

7. A demultiplexer as set forth in claim 1, wherein the control data in a packet is comprised of identification information of the specific individual data stored in a related packet and version number information indicating the version of the specific individual data stored in the related packet, wherein the mask bit corresponding to a portion of the identification information in the control data has an unmasking value, the first comparison data corresponding to the portion of the identification information has identification information of the specific individual data, and wherein the mask bit corresponding to the portion of the version number information in the control data has a masking value, and a composing bit of the first comparison data corresponding to the portion of the version number information has a first value.

* * * * *